Sept. 10, 1968      H. W. CRAMER      3,400,574
METHOD AND APPARATUS FOR TESTING PIPELINES
Filed Oct. 31, 1966      4 Sheets-Sheet 1
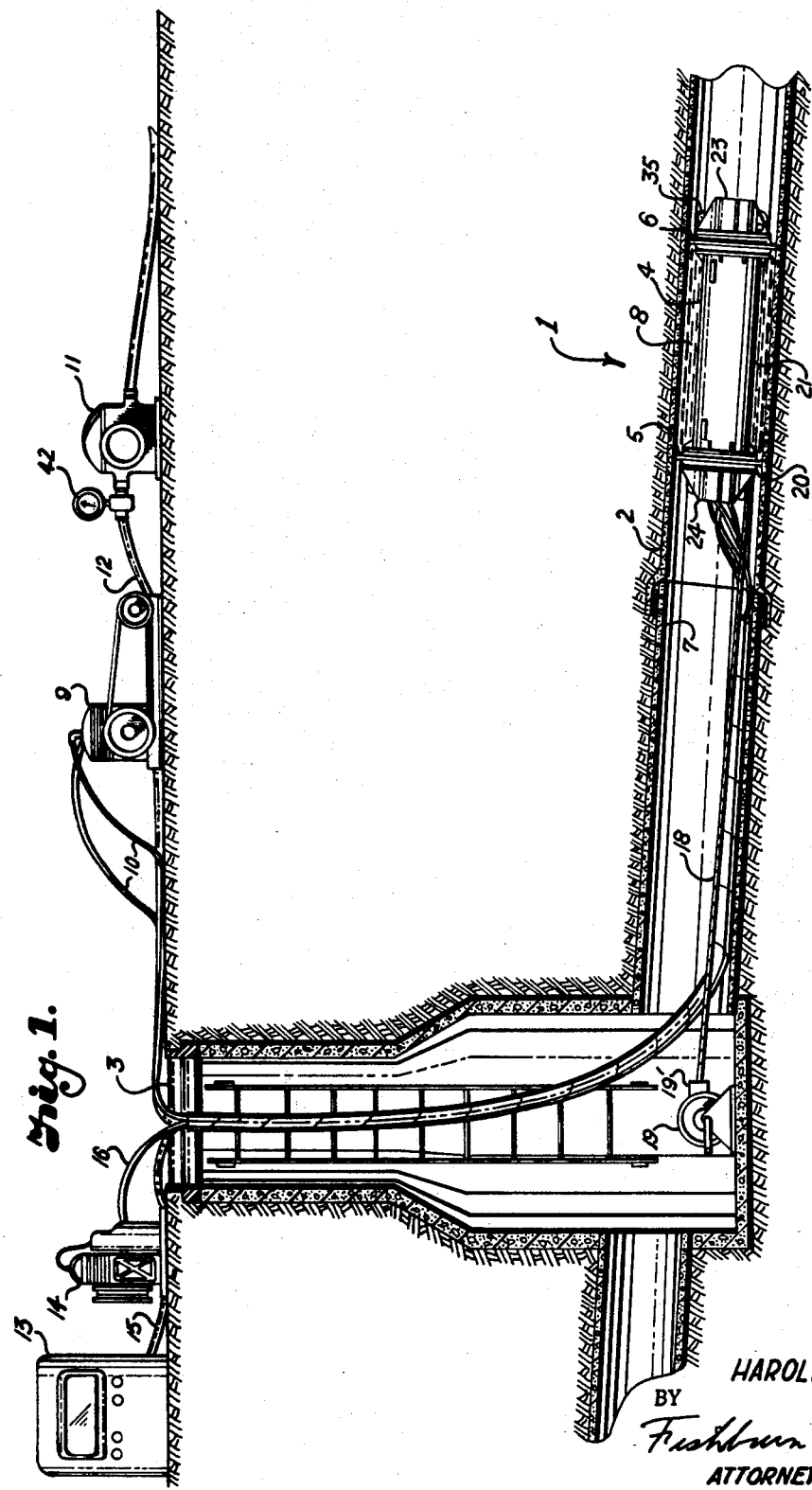
INVENTOR.
HAROLD W. CRAMER
BY
*Fishburn and Gold*
ATTORNEYS

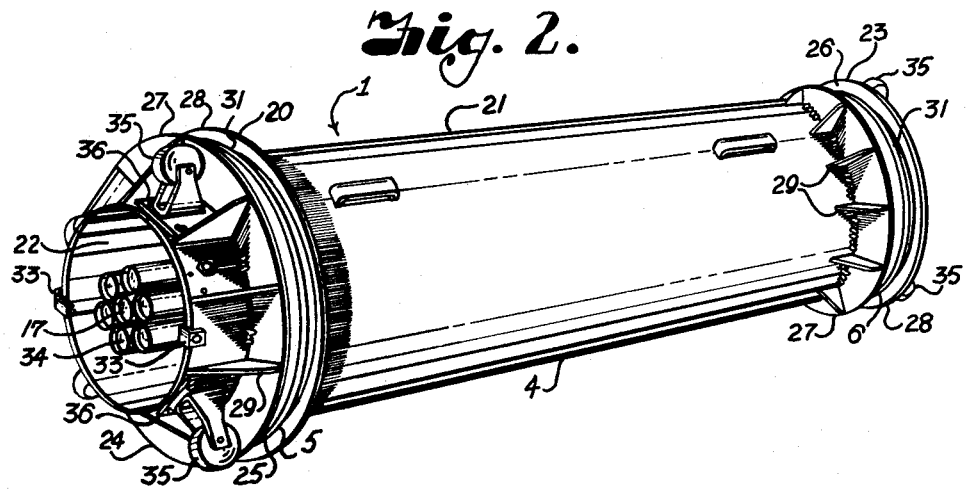
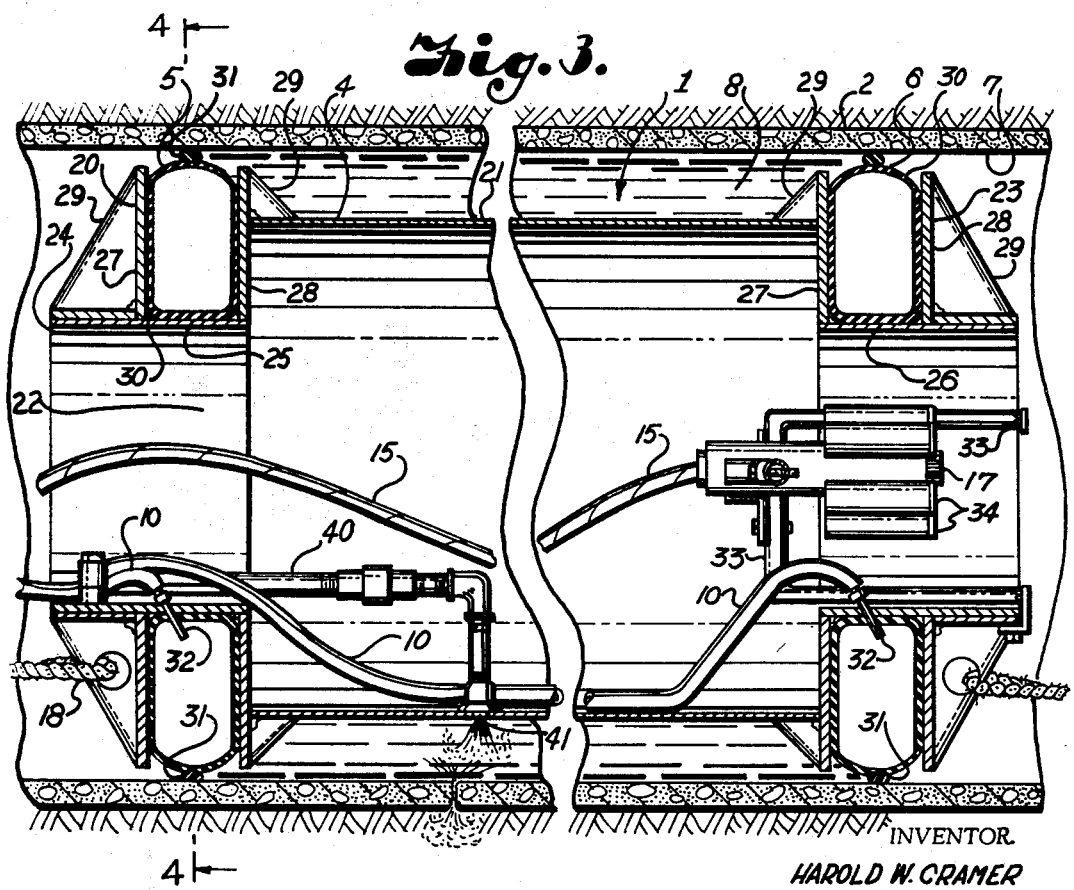

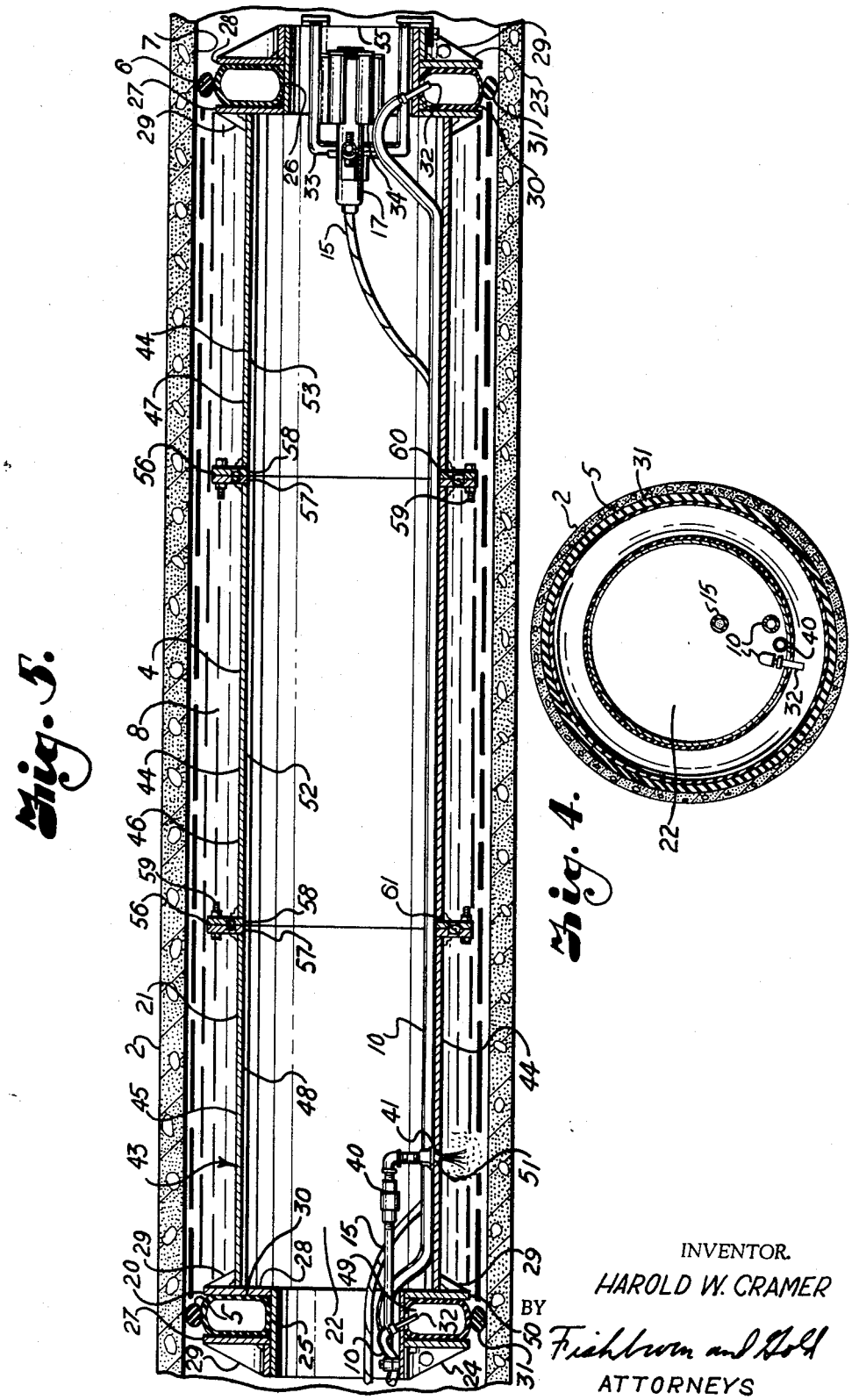

Sept. 10, 1968  H. W. CRAMER  3,400,574
METHOD AND APPARATUS FOR TESTING PIPELINES
Filed Oct. 31, 1966  4 Sheets-Sheet 4
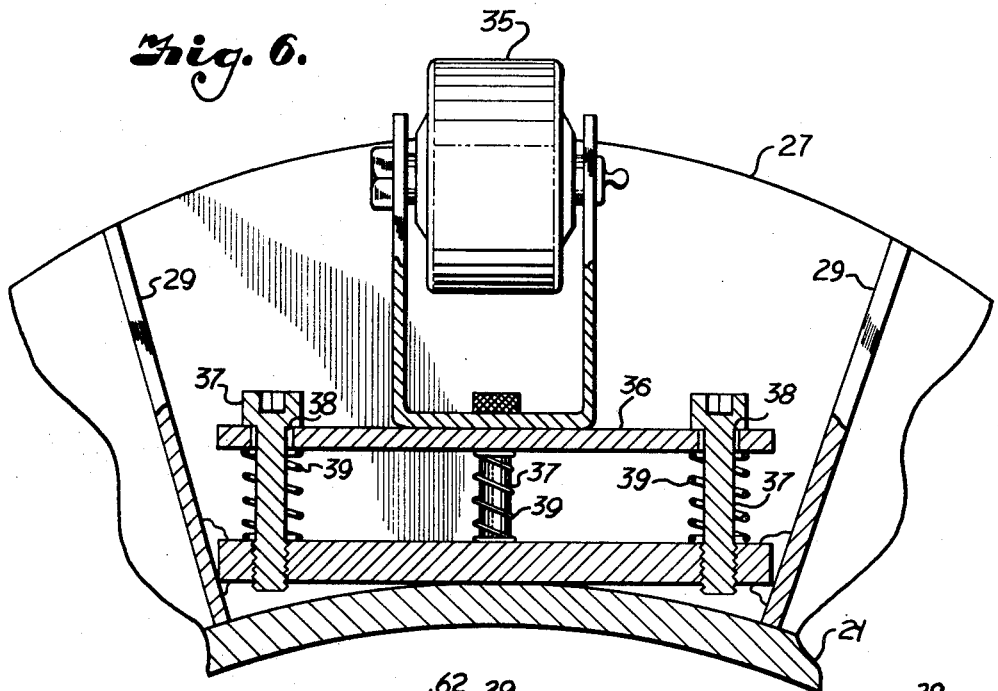
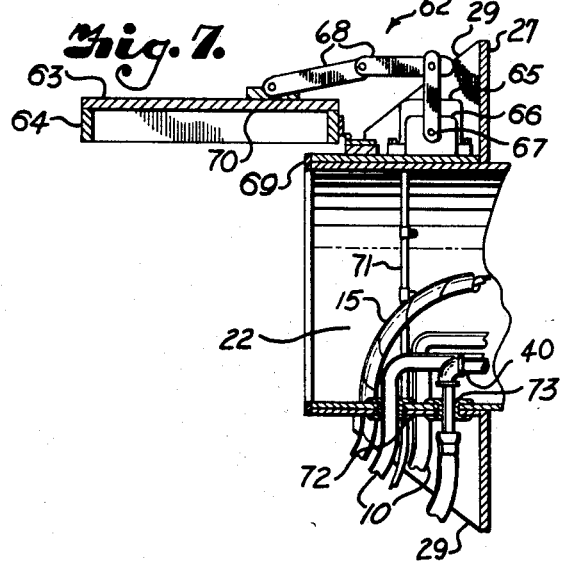
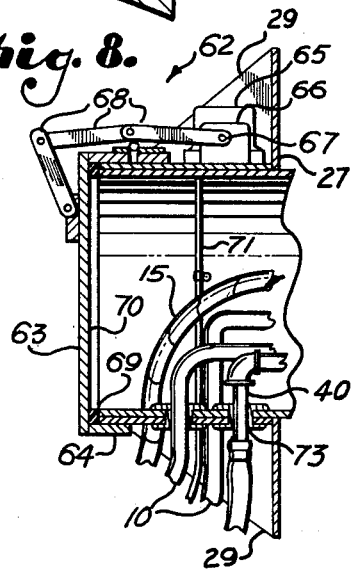
INVENTOR.
HAROLD W. CRAMER
BY
Fishburn and Gold
ATTORNEYS

United States Patent Office 3,400,574
Patented Sept. 10, 1968

3,400,574
METHOD AND APPARATUS FOR TESTING PIPELINES
Harold W. Cramer, 8419 Linden Lane, Shawnee Mission, Kans. 66207
Filed Oct. 31, 1966, Ser. No. 590,599
11 Claims. (Cl. 73—40.5)

ABSTRACT OF THE DISCLOSURE

A pipeline leak testing apparatus having an elongate body member movable through a pipeline with longitudinally spaced expandable seal members on the body member and engageable with the interior of a pipeline to form a test chamber therebetween, with operating structures for expanding the seals and operative structure connected to the body and communicating with the test chamber to provide a fluid pressure medium therein and pressure sensitive means to indicate pressure changes in the chamber in testing for leaks. A television camera being mounted in the forward portion of the apparatus with lights for viewing the interior of the pipeline, a closure means on the apparatus for closing the passage therethrough to stop flow of liquids in the pipeline when the seals are engaged with said line. And the method of testing pipeline for leaks by moving a testing apparatus through the line effecting sealing engagement with the interior of the line and introducing pressure into a test chamber and monitoring the pressure to determine presence of leaks.

---

This invention relates to the detection and location of infiltration and exfiltration leakage in pipelines and the like and more particularly, to a method and apparatus for testing sections of new and old pipelines or the like to detect and locate flaws in said lines causing leakage to or from said lines.

The acceptance of a contractor's work on newly constructed pipelines is usually conditioned upon the satisfactory performance of various pressure and/or flow tests in said line to ascertain the tightness of the pipeline. If such tests indicate leakage in the line, the contractor must commence an expensive operation of locating the source of the leak. This location process will likely involve the uncovering of extensive lengths of pipe to permit visual inspection of the pipe, pipe joints and the surrounding soil. This same expensive location process must be conducted in relation to existing pipelines where pressure loss or other evidence indicates that leakage is occurring. It is further desirable in existing lines to investigate the line itself periodically to ascertain the interior condition of the line and locate sources of leakage in said lines.

Various devices and method have been developed for testing large sections of pipelines. Other and less numerous devices have been developed for pinpointing the source of the leak itself; however, these latter devices have proved unsatisfactory due to such factors as their susceptibility of becoming lodged within said line and the nature of their sealing means which impose excessive hoop stresses in the line. Where such a device does become lodged, it is necessary to initiate an expensive operation of uncovering the pipeline, opening a section of the line, removing the device and replacing the section of said line.

The principal objects of this invention are: to alleviate the aforementioned difficulties in the art by providing a new and improved method and apparatus for the detection and location of leakage in pipes, conduits or the like; to provide such a method and apparatus which will pinpoint either infiltration or exfiltration leakage to or from respectively a pipe or the like and indicate the extent of said leakage; to provide such an apparatus which may be easily and simply employed within a pipeline or the like and which is not susceptible to becoming lodged within said line and if lodged, may be released by suitable means without causing stoppage of the flow within said pipeline or the like; to provide such a method and apparatus which may be easily employed in either new or existing pipelines to detect leakage within said lines and locate said leakage at a minimum of expense with a minimum of personnel; to provide such an apparatus which may be simply and inexpensively manufactured and easily utilized without extensive training of personnel; to provide a new and improved testing apparatus employing a means for sealing off a section of a pipeline which effectively seals said section with a minimum hoop stress applied to said line.

This invention contemplates an apparatus having a carriage member, said carriage member including a body portion defining a flow passage therethrough and further defining a pair of longitudinally spaced circumferentially extending grooves, the carriage member also including a plurality of rollers operatively mounted thereto to movably engage the interior surface of a pipeline to retain the body portion in spaced relation from said interior surface and to facilitate the movement of the carriage through said pipeline. The invention further contemplates the employment of an inflatable member or sealing means in each of said grooves with means associated therewith to inflate and deflate said sealers, whereby inflation of said sealers causes them to abuttingly engage the interior surface of the pipeline to seal off said pipeline and thereby define a test chamber between the body portion of said carriage and the interior surface of the pipe and said sealers with means in communication with said test chamber for introducing a pressure medium to said test chamber and further including means in communication with said test chamber for gauging the pressure within said chamber The invention also contemplates in certain areas of utilization the inclusion of a television pick-up means including a television camera with light means for illumination of the interior of the pipe for televising the interior of the pipe to locate cave-in areas or other areas of visible deterioration, said pick-up means may be mounted to said carriage and operatively connected by a close circuit to a television monitor for viewing the interior of said pipe.

Other objects and advantages of this invention will become apparent from the following description taken in connection with the accompanying drawings wherein are set forth by way of illustration and example certain embodiments of this invention.

FIG. 1 is a sectional view through a manhole and pipeline showing the disposition of an apparatus embodying the features of this invention within said pipeline.

FIG. 2 is a perspective view of a testing unit embodying the features of this invention.

FIG. 3 is a sectional view through a tester unit showing said unit in its testing position within a pipeline, conduit or the like.

FIG. 4 is a transverse sectional view through the testing unit and pipeline taken on line 4—4 of FIG. 3.

FIG. 5 is a sectional view through a modified form of the tester unit showing its disposition in a pipeline under test conditions.

FIG. 6 is a detail of a roller and roller mounting to the carriage of a tester unit.

FIG. 7 is a sectional view through a modified form of a testing unit which employs a closure member to seal off the flow passage through said unit with said closure member in an open position.

FIG. 8 is a sectional view through the modified form of testing unit shown in FIG. 7 with the closure member in a closed position.

Referring to the drawings in more detail:

The reference numeral 1 generally refers to a leakage detection and locating apparatus embodying the features of this invention and illustrated as being employed in a pipeline 2 through a manhole structure 3 and on the ground surface. The apparatus 1 illustrated in FIG. 1 is of the type which would normally be employed for the inspection of a newly constructed pipe line in which flow within the pipeline has not yet commenced. The arrangement of apparatus 1 could be slightly altered in manners to be discussed later when utilized in existing or old pipelines wherein flow is continual throughout the inspection or testing operation.

In FIG. 1, the apparatus 1 having a testing unit 4 is illustrated in its test position wherein a pair of longitudinally spaced sealing means 5 and 6 which are operatively connected in a circumferential manner about the tester 4 are moved into abutting relation with the interior surface 7 of the pipe line to define between the interior surface 7 and the testing unit 4, a test chamber 8 which extends circumferentially about the testing unit 4. The sealing means 5 and 6, as illustrated, are moved into abutting relation with pipe 2 by inflation of the sealing means 5 and 6 by means of an air compressor 9 which, as illustrated, is located on the ground surface and connected to the testing unit 4 by means of a pair of air hoses 10. After inflation of the sealing means 5 and 6, a pressure medium such as water or air is pumped into the test chamber 8 by means of a pump assembly 11, illustrated on the ground surface and interposed in a pressure medium supply line or conduit 12, which extends from a pressure medium source to the testing unit 4 and is in communication with the test chamber 8 and includes means sensitive to pressure variation such as a pressure gauge 42. The apparatus 1, as illustrated, also includes a television facility which is comprised of a television monitor set 13 and a portable electrical generating set 14, each of which are operatively connected by means of cables 15 and 16 to a television pick-up means illustrated as a television camera 17 and lights 34.

In the illustrated embodiment, the testing unit 4 is allowed to move through the pipe line 2 by gravity and is retained against movement for setting the testing unit 4 at a test position by means of a cable or rope 18 which is operatively secured to a reeling apparatus 19 shown on the floor of the manhole 3. The apparatus 19 could be elevated in the manhole structure 3 where the line 2 is presently in use. The reeling apparatus 19 contains a measuring pulley 19' to determine the amount of cable 18 unreeled and thereby the location of the test position. Various other means may be utilized to measure the distance from the manhole 3 to the test position such as attaching a tape measure to the testing unit 4. Various means may be utilized to propel the testing unit 4 through the pipeline 2 such as securing a cable or rope to the forward end of the testing unit 4 and pulling said unit 4 through the pipeline or in pipelines where flow exists at the time of testing, said flow may be utilized in propelling the testing unit 4 in a downstream direction.

Referring to FIGS. 2 and 3, the testing unit 4 includes a carriage means or vehicle 20 having a body portion 21 which defines a flow passage 22 through the testing unit 4 which prevents the testing unit 4 from becoming such an obstruction within the pipeline 2, which would prevent flow through the pipe line 2 should the unit 4 become lodged in line 2.

The flow passage 22 will allow continued operation of the pipeline 2 until the testing unit 4 can be released by suitable means. The body portion 21 has opposed end portions 23 and 24, each of said end portions 23 and 24, as illustrated, defining a circumferential groove 25 and 26 respectively in which the sealing means 5 and 6 respectively are disposed. The end portions 23 and 24 have tapered end surfaces which assist in providing a carriage 20 which is not susceptible to becoming lodged within the pipeline 2. In the illustrated embodiment, the grooves 25 and 26 are defined by a pair of upstanding flanges 27 and 28 which are braced in position by a plurality of wedge braces 29.

The sealing means 5 and 6 which are disposed in the circumferential grooves 25 and 26 respectively are each comprised of a tubular inflatable member 30 which is formed of a suitable resilient material, each of said tubular members 30 having a rib, bead or protrusion 31 centrally located and circumferentially extending about said tubular members 30. The rib 31 is also formed of a resilient material and is pushed or moved into abutting relation with the inner surface 7 of the pipeline 2 upon the expansion of the tubular member 30 to effect a sealing off of the test chamber 8 which lies between the longitudinally spaced sealing means 5 and 6. The utilization of the bead 31 on the tubular members 30 enables an effective sealing of the test chamber 8 without the exertion of a large pressure outwardly against the walls of the pipeline thereby maintaining the seal without imposing a large hoop or circumferential stress on said pipe. This feature is critical in testing of many old lines and in various new lines where the ability of the pipe and joints to withstand a hoop stress is limited.

The tubular members 30 in their deflated position lie within the confines of the circumferential grooves 25 and 26 such that the testing unit 4 may be moved through the pipe line 2 without the danger of the tubular members 30 becoming snagged by projections on the pipe line's interior, causing the unit 4 to become lodged in the line or damaging the tubular member 30. Each of the tubular members 30 are operatively connected to a separate air hose 10 by means of a nozzle 32 which extends into the interior portion of the tubular members 30 to provide communication between the tubular members 30 and the air compressor 9. The separate air lines 10 allow the tubular members to be selectively inflated and deflated to facilitate the testing operation.

The television camera 17, as illustrated, is positioned in the forward end portion 23 of the carriage 20 and suitably retained therein as by the bracket assembly 33. The camera 17 is disposed centrally of a plurality of lights 34 which serve to illuminate the interior of the pipe line 2 such that the television image may be transmitted to the monitor screen 13, thereby providing complete visual inspection of the pipe forward of the testing unit 4 to warn those conducting the test of obstructions within the pipe line which might cause the testing unit 4 to become lodged within line 2 and to inspect the condition of the pipe's interior surface to indicate areas of deterioration where testing should be conducted.

The body portion 21 has means operatively mounted thereto to movingly engage the interior surface 7 of the line 2 to support said body portion 21 in spaced relation from surface 7 within line 2, said means being illustrated herein as a plurality of rollers 35 disposed circumferentially about the body portion 20 and aligned to engage the interior surface 7 of line 2 for longitudinal movement of the carriage 20 therethrough. Each of the rollers 35, as illustrated in FIG. 6, is mounted on a retaining plate 36 which is, in turn, springingly retained to the body portion 21 by a plurality of bolts 37 disposed through apertures 38 in plate 36. A spring 39 is disposed about each of said bolts 37 between the body portion 21 and the plate 36 to springingly retain the plate 36 in spaced relation from the body portion 21. The rollers 35 are thereby resiliently retained to the body portion 21 of the carriage 20 and forced into abutting rolling engagement with the interior surface 7 of line 2.

The test chamber 8 has a pressure medium such as water or air supplied thereto through a suitable piping system 40 which is operably secured to the supply hose 12 which extends through line 2 from the pumping assembly 11. The body portion 21 of the testing unit 4 defines an aperture 41 therethrough in communication with the test chamber 8 and the flow passage in the piping system 40 to allow the entry of the pressure medium into test chamber 8 to effect the testing of the pipe line 2. The supply line 12, as illustrated, has a pressure gauge 42 operatively mounted therein adjacent the pump assembly which indicates the pressure within line 12 and the test chamber 8 such that pressure variances effected by leakage within pipe line 2 may be monitored.

Referring to FIG. 5, a modified form of the testing unit 4 is illustrated and designated by the reference numeral 43. The testing unit 43 is comprised of a plurality of separable segments or sections 44 illustrated as a rearward section 45, a mid section 46 and a forward section 47. The testing unit 43 has been sectionalized in order to facilitate the testing of a longer segment of pipe or effectively increasing the area of the test chamber 8 with the recognition that the testing unit 43 will be inserted within a pipe line such as pipe line 2 through a manhole such as the manhole structure 3 shown in FIG. 1. In view of the limited space in such structures, it is therefore necessary to sectionalize the testing unit 43 such that the forward section 47 may first be placed in the pipe line 2, the mid section 46, then lowered into the manhole structure 3 and operatively connected to the forward section 47, said mid section 46 then being pushed forwardly into the pipe line 2 and the rearward section 45 being lowered and operatively connected to the mid section 46.

The rearward section 45 has a body portion 48 which is generally tubular in shape defining a flow passage therethrough and defining a circumferential groove 49 extending about its rearward end portion 50. The groove 49 is formed in the same manner as discussed in relation to circumferential grooves 25 and 26 on the testing unit 4 and has the sealing means 5 operatively mounted therein. The piping system 40 extends forwardly through the rearward section 45 in communication with an aperture 51 through the body portion 48 to provide communication between the piping system 40 and the test chamber 8.

The mid section 46 is comprised of a body portion 52 which is tubular in structure and defines a flow passage therethrough in communication with the flow passage of the rearward section 45.

The forward end section 47 of the testing unit 43 has a body portion 53 defining a flow passage therethrough in communication with the flow passages through the sections 46 and 45 and said body portion 53 further defining a circumferential groove 54 extending about its forward end portion 55 in the same manner as discussed in relation to groove 25 on the testing unit 4. The sealing means 6 is disposed in the circumferential groove 54 in such a manner as to cooperate with the sealing means 5 in defining the test chamber 8 in the manner previously discussed. The television cameras 17 and its plurality of lights 34 are mounted by a bracket 33 in the forward end portion 55 of the forward section 47 of test unit 43.

The forward end section 47 and the rearward end section 45 are each operably mounted to the mid section 46 by a releasable flange connection 56. The flange connections 56 are each comprised of a pair of circumferentially extending outwardly directed flanges 57 and 58, said flanges being suitably secured to both the end sections 45 and 47 and to the mid section 46 respectively. The flanges 57 and 58 are disposed in contacting relation to one another and secured in this position by means of a plurality of nut and bolt assemblies 59 disposed at predetermined intervals about the circumference of testing unit 43. Each of the flanges 57 and 58 have a notched portion 60, said notched portions 60 being in aligned position to define a through opening 61 extending circumferentially of testing unit 43 in the flanges 57 and 58. A suitable sealing means is disposed within the notches 60 to effect a sealing of the flanges 57 and 58, thereby preventing the escape or entry of a pressure fluid from or to the test chamber 8 through the flange connections 56.

As it is sometimes desirable to employ the flow within the piping system as either a means of propelling a testing unit or as a supply of fluid pressure for the test chamber 8, it is desirable to provide the testing unit 43 with a means for closing the flow passage 22 through said testing units. The fluid pressure of the fluid flowing within the piping system is then directed against the closed end of the testing unit 4 and around the testing unit 5. Referring to FIGS. 7 and 8, a closure mechanism or means 62 is illustrated whereby a closure member 63 may be moved into a position overlying the rearward end portion 24 of the testing unit 4 thereby effecting a seal of the flow passage 22. The closure member 63, as illustrated, has a generally circular body portion conforming to the shape of the illustrated flow passage 22 with a circumferential inwardly extending flange 64 which is moved into an exterior relation with the end portion 24 of the body portion 21 of testing unit 4.

As illustrated in FIG. 7, the closure member 63 may be retained in a generally horizontal position allowing flow through the flow passage 22 until it is desired to seal flow passage 22. At that time, the closure member 63 can be moved into a generally vertical or sealing position, as illustrated in FIG. 8, by suitable activating means illustrated herein as a motor 65 operatively connected to a suitable gear reduction system or box 66 to drive a shaft 67 which is operatively connected to a series of activating linkages 68 which serve to move the closure member 63 in and out of its sealing position in relation to the end portion 24 of the tester unit 4. In this modification, the end portion 24 has a gasket or sealing member 69 disposed circumferentially about its rearward edge portion to provide a resilient bearing surface against which the interior surface 70 of the closure member 63 may bear when forced into contact with the gasket member 69. A cable 71 extends from the motor 65 around the inner surface of the body portion 21 of unit 4 and outwardly through a properly sealed opening 72 in said body portion 21. The operation of the motor may then be effected from an individual in the manhole structure 3 or on the ground surface to effect the opening or closing of the closure member 63.

In the illustrated embodiment of FIGS. 7 and 8, the television cable 15, air hoses 10 and the piping system 40 are all directed through a plurality of apertures 73 in the body portion 21, said apertures being properly sealed to prevent the entry of the fluid flowing through the piping system.

In operation, the testing unit 4 or 43 is placed in the pipeline 2 and moved by suitable means to a predetermined point or location within line 2 to conduct the first test. The exact location of the testing unit 4 within the pipeline 3 is monitored by measuring the amount of cable line 18 which is dispensed from the reel 19 by suitable means such as a measuring pulley 19'. When the testing unit 4 is placed in the desired position in the pipeline 2, the sealing means 5 and 6 are moved into sealing relation with the pipe 2 by activating the air compressor 9 to provide pressure to the tubes 30 of the sealing means 5 and 6. The tubes may be inflated to approximately 15 pounds of pressure moving the circumferential bead 31 on each of said tubes 30 into the desired abutting relation with the interior surface 7 of the pipeline 2 to thereby define the test chamber 8 between the spaced sealing means 5 and 6. After inflation of the sealing means 5 and 6, a pressure medium is introduced to chamber 8 by activating the pump assembly 11 to pump a pressure medium such as air or water into the test chamber 8 to a pressure less than the pressure in the sealing means 5 and 6. The pressure in chamber 8 is then gauged by monitoring gauge 42 on the supply line 12 and the loss timed to ascertain a pressure loss from the test chamber 8 and the rate of such loss to determine if the section of the pipeline 2 presently being tested contains a flaw resulting in the leakage of the pressure medium from said line 2 and the extent of that leakage. Where air is utilized in the testing of concrete pipes, some escapement of air from the pipeline 2 would be permissible. It, therefore, becomes critical in concrete lines to establish standards by suitable testing for acceptable rates of pressure loss. The pressure drop indicated on gauge 42 may then be timed to determine if the loss rate falls within the acceptable range established by the standards testing.

Where it is desired to test new joints, for instance, in the inspection of sewer lines, as the joints are made, a much smaller test unit 4 may be employed being sufficiently large only to have sealing means 5 and 6 which straddle the joint being inspected or tested such that the testing unit 4 may be easily handled and rapidly inserted and removed from the pipe section. In this instance, the joint testing will be conducted in the same manner as previously described in regard to completed lines with the exception that the testing unit 4 will not be placed on a cable 18, but will be inserted and removed as each joint is formed and tested.

It is also possible with this testing unit 4 to conduct a continuous movement testing operation or investigative test to locate areas of potential leakage. This type of testing would be extremely useful in long lines such as water lines where there are relatively few juncture lines intercepting the main line. The procedure in this case would be to inflate the sealing means 5 and 6 to a point where the circumferential rib 31 is almost in contact with or slightly spaced from the inner surface 7 of pipeline 2. Then, the pressure medium is continuously injected or introduced into the test chamber at a volume great enough to maintain a predetermined pressure within the chamber 8 even though a portion of the pressure medium will escape between the rib 31 and the interior surface 7 of the pipeline 2. The test unit 4 is then continuously moved through the pipeline with constant monitoring as to the location of the test unit 4 by means of the pulley 19' or other measuring devices. When the testing unit 4 reaches a defective pipe section or joint, a pressure drop on gauge 42 will appear whereupon the testing unit 4 may be stopped and a more extensive test of the nature of the type described above can be conducted to determine the extent of the leakage of that section of the pipe if so desired.

In the testing of old lines, for instance, old sewer lines, it is desirable to mount a television in the forward end portion 21 of the test unit 4 in order to survey the interior of the pipe as the test unit is passed through the pipe line 2. This surveillance is important in the first instance to notify those conducting the test of cave-ins or other obstructions within the line 2 which might cause the testing unit 4 to become lodged or jammed within the pipe line 2. Secondly, the test may be conducted by moving the testing unit 4 including a television camera 17 through the pipe line 2 viewing the interior of the pipe to determine specific areas of erosion or deterioration at which it would be desirable to stop the movement of the test unit 4 and conduct a test of the nature described above. Such an operation may save a good deal of time where it is obvious from viewing the interior of the pipe that said pipe is in good condition. It is not intended by this description to limit the use of the television camera in combination with the test unit 4 to old pipe lines, as the combination may also be employed in various new lines including water lines and with the continuous movement method of testing described above. In the continuous movement method of testing, the television camera would point out specific areas where it might be desirable to stop the continuous testing and conduct a test with the unit 4 in a fixed position within the pipe line.

The connection of laterals or surfaces to a main sewer line present weak points within the lines which must be tested. In view of the fact that the leak may be occurring about the joint of the intersecting line, it is important that the juncture point be straddled by the sealing means 5 and 6, or in other words, be within the test chamber 8. It may readily be seen that to so straddle the lateral by the sealing means 5 and 6 would simply result in forcing the pressure medium into the lateral itself thereby preventing the sufficient buildup of pressure within the test chamber 8 to conduct the tests in the manner described previously. In this instance, a modified testing form or process has been developed which permits the testing of a sewer or other line at the flow junctures of the intersecting flow lines. In this process, the tester 4 is placed in a straddling position of the intersecting flow line such that the forward sealing means 6 is downstream from the intersecting flow line. With the testing unit 4 in this position, the sealing tube 30 at the forward end portion 23 is inflated to move bead 31 into abutting sealing relation with the interior surface 7 of the pipe line 2. The fluid within the pipe line 2 and the intersecting flow line begins to back up within the intersecting flow line and the pipe line 2 until a sufficient level is reached within the pipeline 2 to effect a flow through the flow passage 22 of the testing unit 4. At that time, the operator activates the compressor 9 and opens the air hose 10 extending to the sealing tube 30 at the rearward portion 24 of the test unit 4 to effectively seal off the test chamber 8. The pumping apparatus 11 is then activated to fill the remainder of the test chamber 8 and effect a back-up fluid in the intersecting flow line to provide a sufficient head pressure within the test chamber 8 for monitoring on the pressure gauge 42. The flow from the intersecting flow line is then stopped by sealing off said line and the pressure gauge 42 monitored to see if a pressure drop occurs in the test chamber 8, thereby indicating leakage in the pipe line 2, or the intersecting flow line at its connection to the pipe line 2.

The build-up of pressure fluid within the test chamber 8 may also be effected by sealing the flow passage 22 through the testing unit 4 by means of closure 63 which may be activated to its sealed position by actuating the motor assembly 65. The flow within the pipe line 2 is then directed about the testing unit 4 to fill the test chamber 8 and when the test chamber 8 is filled and the pressure therein has reached a sufficient level for testing air pressure is applied to the sealing tube 30 at the rearward portion 24 of the test unit 4 inflating same and thereby sealing off chamber 8. Then the pressure within chamber 8 is again monitored to determine if a pressure drop occurs, thereby indicating a leakage in that section of the pipe line 2.

It is to be understood that while we have illustrated and described one form of our invention, it is not to be limited to the specific form or arrangement of parts herein described and shown except insofar as such limitations are included in the claims.

What I claim and desire to secure by Letters Patent is:

1. The method of testing for leakage in a pipeline having flowing liquid therein using a movable carriage means having a through flow passage and opposed spaced forward and rearward sealing means operatively mounted thereto with means on said carriage for moving said sealing means into sealing relation with the pipe of said pipeline comprising:
   (a) moving said carriage means through said line to a predetermined point within said line,
   (b) moving said forward sealing means into sealing relation with said pipe to close flow between the carriage and pipe,
   (c) closing the flow passage in the carriage means to stop flow of liquid past said carriage means and permit the liquid to fill the pipe around the carriage means between the forward and rearward seal means,
   (d) moving the rearward sealing means to sealing relation with said pipe to define a test chamber between the forward and rearward seal means with said test chamber full of the liquid at a pressure effected by liquid in the pipe rearwardly thereof at the time of the sealing engagement of the rearward seal means, (e) monitoring the liquid pressure in the test chamber whereby pressure change indicates the existence of leakage to or from the line.

2. A method of testing for leakage in a pipeline as recited in claim 1 including the step of continuously measuring the distance between the carriage means and a point of known location thereby indicating the position of said carriage means within said pipeline.

3. A method of testing for leakage in a pipeline using a movable carriage means having spaced sealing means operatively mounted thereto with means for moving said sealing means into sealing relation with said pipe comprising:
(a) moving said carriage means continuously through said pipeline,
(b) moving said spaced sealing means into a position slightly spaced from the interior surface of said pipeline,
(c) continuously introducing a pressure medium to said test chamber,
(d) gauging said pressure medium within said test chamber for pressure loss whereby the pressure loss indicates potential leakage to or from said line, 4. A method of testing for leakage in a pipeline as recited in claim 3 including the step of continuously measuring the distance between the carriage means and a point of known location thereby indicating the position of the carriage means within the pipeline to exactly locate the points of leakage within said line.

5. A method of testing for leakage in a pipeline as recited in claim 3 including the steps of moving a television pick-up means through said line ahead of said carriage and televising the interior of said pipeline as the carriage means is continuously moved through said pipeline to indicate the existence of obstructions or cave-ins within said line and areas of deterioration.

6. A method of testing for leakage in a pipeline as recited in claim 5 including the steps of stopping said carriage means at points within said pipeline where deterioration is indicated, moving said spaced sealing means into sealing relation with said pipeline to define a test chamber therebetween, introducing a pressure medium to said test chamber, gauging said pressure medium within said chamber for pressure loss whereby the pressure loss indicates the existence of leakage to or from said line.

7. A method of testing for leakage in a pipeline as recited in claim 3 including the steps of stopping said carriage means at points within said line where potential leakage is indicated by pressure loss, moving said spaced sealing means into sealing relation with said pipeline to define a test chamber, introducing a pressure medium to said test chamber, gauging said pressure medium within said chamber for pressure loss whereby the pressure loss indicates the existence of leakage to or from said line.

8. A testing apparatus for ascertaining leakage in pipelines or the like comprising:
(a) a carriage having a hollow body portion formed of an elongate cylindrical tube with opposed end portions, flanges fixed to the ends of the tube and extending radially outwardly with peripheral diameters less than the interior of a pipeline to be tested, said end portions having longitudinally extending walls defining tubular members smaller than the body portion and fixed to inner portions of the flanges, said end portion walls defining openings communicating with the body interior and forming therewith a through flow passageway,
(b) means supported on said end portions for movably engaging the interior surface of said pipeline to facilitate the movement of the carriage through said pipeline,
(c) means on each of said end portions and spaced outwardly longitudinally of the carriage from the respective flanges and cooperating therewith to define annular channels,
(d) an inflatable tube in each of said channels and having a peripheral seal portion, said tubes being spaced from the interior surface of the pipeline when deflated and the seal portions sealingly engaging said interior surface when the tubes are inflated and cooperating with the body to define a test chamber between the tubes and flanges,
(e) fluid pressure means operatively connected with each of said tubes for selectively inflating and deflating same,
(f) means operatively connected to said carriage in communication with said test chamber to provide a fluid pressure medium in said chamber,
(g) means in communication with said test chamber and sensitive to pressure variation to indicate pressure changes within said chamber.

9. A testing apparatus as set forth in claim 8 wherein the means on the end portions cooperating to form the channels are removable and include members sleeved on said smaller tubular members and annular walls extending radially outwardly with a periphery substantially the same diameter as the adjacent flange.

10. A testing apparatus as set forth in claim 8 wherein the cylindrical tube of the body portion is sectional with adjacent ends of the sections separably connected together and said flanges are on ends of the endmost sections whereby the test chamber extends the total length of the body portion tube.

11. A testing apparatus as set forth in claim 8 and including:
(a) a closure movably mounted on an end portion tubular member and operable to close the opening therethrough,
(b) and operating means connected to said closure for selectively moving same into open and closed positions.

References Cited

UNITED STATES PATENTS

| 1,931,502 | 10/1933 | Markle et al. | 73—46 |
| 2,192,155 | 2/1940 | Schuldt | 73—40.5 |
| 2,299,116 | 10/1942 | Svirsky. | |
| 2,908,248 | 10/1959 | Brant | 138—97 XR |
| 2,971,259 | 2/1961 | Hahnau et al. | 33—1 |
| 3,000,205 | 9/1961 | Suderow | 73—40.5 XR |
| 3,132,506 | 5/1964 | Pritchett | 73—40.5 |
| 3,168,908 | 2/1965 | Zurbrigen et al. | 33—1 XR |
| 3,168,909 | 2/1965 | Zurbrigen et al. | |
| 3,338,088 | 8/1967 | Smith et al. | 73—46 |
| 3,342,061 | 9/1967 | Morris | 73—40.5 |

FOREIGN PATENTS 706,348   3/1954   Great Britain.

S. CLEMENT SWISHER, *Acting Primary Examiner.*

JEFFREY NOLTON, *Assistant Examiner.*